G. McFEELY,
Assignor to W. J. SHERRIFF.
STEAM PUMP.
No. 10,475. Reissued May 6, 1884.
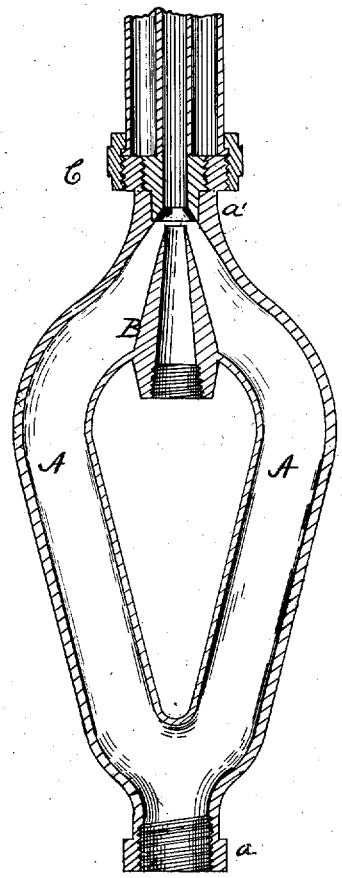
WITNESSES.
W. B. Corwin
Geo. K. Smith
INVENTOR.
George McFeely
by his attys
Bakewell & Kerr

UNITED STATES PATENT OFFICE.

GEORGE McFEELY, OF STEUBENVILLE, OHIO, ASSIGNOR TO WILLIAM J. SHERRIFF, OF PITTSBURG, PENNSYLVANIA.

STEAM-PUMP.

SPECIFICATION forming part of Reissued Letters Patent No. 10,475, dated May 6, 1884.

Original No. 94,426, dated August 31, 1869. Application for reissue filed January 24, 1884.

*To all whom it may concern:*

Be it known that I, GEORGE McFEELY, of Steubenville, in the county of Jefferson and State of Ohio, have invented a new and useful Improvement in Steam-Pumps; and I do hereby declare the following to be a full, clear, and exact description thereof, reference being had to the accompanying drawing, making part of this specification, and to the letters of reference marked thereon.

The nature of my invention consists in the connection of two or more curved pipes together at their upper and lower ends, whereby the lower ends may be attached to a suction-pipe and the upper ends to a discharge-pipe, and in the arrangement of a steam-pipe at or near the upper point of junction, for the purpose of raising water by creating a vacuum in the curved pipes, and of a bush or thimble in the discharge end of the pump, for the purpose of giving greater force to the water passing through it, said bush having a short pipe or tube extending into the larger discharge-pipe.

To enable those skilled in the art to which my invention appertains to make and use the same, I will proceed to describe its construction and operation.

The drawing shows a vertical section of my pump.

A A represent two pipes, joined together at their upper and lower ends, and curved outward in such a manner that the space between them is somewhat of the form of an inverted truncated cone. The lower end, *a*, is to be attached to a suction-pipe leading from the vessel containing the water or other liquid to be raised, and the upper end, *a'*, is to be attached to a discharge-pipe leading to the vessel into which the liquid is to be discharged.

At or near the upper point of junction of the curved pipes A A, and cast or formed with them, and in a line with the discharge-pipe, is a short pipe, B, the bore of which is tapering and the outside conical, and the lower end is provided with a screw-thread or other suitable means for attaching a steam-pipe.

In the discharge end *a'* is inserted a bush or thimble, C, the bore of which is straight, except at the lower end, where it is tapering, so as to form a continuation of the outer sides of the curved pipes A A. In general the diameter of the bore of said bush may be about half that of the pipes A A and about double that of the smaller end of the tapering pipe B; but as a larger or smaller bore may sometimes be required, according to the height to which it is desired to raise the water, I provide a number of bushes with different-sized bores, any one of which may be inserted at pleasure. Instead of having a number of bushes, there may be a number of different-sized tubes, any one of which may be inserted in the bush and the bush allowed to remain in the pipe. A steam-pipe being attached to the pipe B and steam introduced, a vacuum is created in the curved pipes A A and their connections, into which the water rushes and is forced to the end of the discharge-pipe. The tapering pipe B compresses the steam and increases its velocity, and the tapering form of the lower portion of the bush C operates in the same manner upon the water passing through it. This effect may be increased by attaching to the bush a pipe of the same bore, extending up several inches (more or less) inside of the discharge-pipe.

The arrangement of the steam-pipe with the curved pipes enables the steam to be brought into the pump without being exposed to the condensing effect of the water, as is the case with a head having the steam-pipe extending through it.

Having thus described my invention, what I claim as new, and desire to secure by Letters Patent, is—

1. The steam-pipe B, in combination with the curved pipes A A, joined at their upper and lower ends, for connecting with the suction and discharge pipes, and bush C, having a short pipe or tubular extension at its outer end, all arranged substantially as described.

2. The combination, in a steam-pump, of curved outer pipes, joined at their upper and lower ends, with a steam-pipe arranged at or near the upper point of junction, and a bush arranged in the discharge end and provided with a short pipe or tube extending into the discharge-pipe, substantially as described.

In testimony whereof I have hereunto set my hand.

GEORGE McFEELY.

Witnesses:
JOE B. NICHOLSON,
HUGH ARTHURS.